Fig.1

March 31, 1936.  K. H. HUBBARD ET AL  2,035,966
REGULATOR
Filed Nov. 4, 1933   5 Sheets-Sheet 2

INVENTOR
Karl H. Hubbard
Ralph E. Clarridge
BY
D. Clyde Jones
ATTORNEY

March 31, 1936.  K. H. HUBBARD ET AL  2,035,966

REGULATOR

Filed Nov. 4, 1933   5 Sheets-Sheet 3

Fig. 4

INVENTOR
Karl H. Hubbard
Ralph E. Clarridge
BY
D. Clyde Jones
ATTORNEY

Fig.5

March 31, 1936. K. H. HUBBARD ET AL 2,035,966
REGULATOR
Filed Nov. 4, 1933 5 Sheets-Sheet 5

Fig. 6

INVENTOR
Karl H. Hubbard
Ralph E. Clarridge
BY D. Clyde Jones
ATTORNEY

Patented Mar. 31, 1936

2,035,966

UNITED STATES PATENT OFFICE 2,035,966

REGULATOR

Karl H. Hubbard and Ralph E. Clarridge, Rochester, N. Y., assignors to Taylor Instrument Companies, Rochester, N. Y., a corporation of New York Application November 4, 1933, Serial No. 696,650

32 Claims. (Cl. 137—139)

This invention relates to regulating systems.

The usual expansible fluid-operated regulating system is of the single response type which can be adjusted for a given set of conditions and which will maintain a uniform, controlled temperature until there is a change in conditions such as an increase or a decrease in the flow of the regulated medium, a large increase or decrease in the temperature of this medium entering the regulating region, or a change in the regulating medium. In response to such a changed condition, the controlled temperature will change to a new value, since for a definite temperature at the thermosensitive bulb of the regulator under uniform conditions with respect to the regulating medium, there is a definite opening of the regulating valve. Consequently, any change in load results in an increase or decrease of temperature at the thermo-sensitive bulb which is proportional to the change of load and inversely proportional to the sensitivity of the regulator in question. The lower the sensitivity of the regulator the greater the deviation from the desired temperature in the case of load change, and the higher the sensitivity the less this deviation will be. However, as the sensitivity of a regulator is increased, a point is reached beyond which instability is introduced in the regulation effected, which instability causes the system to "hunt" or oscillate about the predetermined temperature.

In the copending application of Karl H. Hubbard, Serial No. 494,179, filed November 7, 1930, there is disclosed a so-called dual response regulator which overcomes the main disadvantages of the usual single response regulating system, by automatically compensating for load changes and also for irregularities in the operation of the regulating system.

The present invention is an improvement over that disclosed in the mentioned pending application and its main feature resides in the provision of a dual response regulating system which is simple to manufacture and assemble, which is readily adjustable to satisfy various requirements encountered in service, and which will provide accurate reliable regulation under extreme adverse conditions.

In former systems of regulation it has been the practice to supply approximately the proper amount of air pressure required for effecting the setting of the regulating valve to give the desired control, trusting that the valve would adjust itself to this setting, but if through lack of proper operation of the parts, such as stuffing box friction, lack of proper flexibility of the rubber diaphragm of the motor valve, and the like, the valve failed to assume this setting, no means were provided to cause the valve to move to the proper point in spite of conditions tending to oppose such movement.

Another feature of the invention, therefore, relates to the provision of means which will effect precision action of the regulating valve in a regulating system, even under adverse conditions.

A further feature of the invention relates to a dual response regulating system in which the movement for actuating the dual response unit is derived from the movement of the valve stem of the motor-actuated valve.

Another feature of the invention resides in a dual response regulating system including means to give precision operation of the motor valve thereof.

An additional feature of the invention relates to a hermetically sealed damping system for a dual response unit which system is completely liquid-filled or is filled both with a liquid and a gas.

A further feature resides in the provision of means to indicate at a remote point any deviation from a predetermined controlled condition.

These and other features of the invention will be recognized from the detailed description and appended claims when taken with the drawings in which

Figure 1:
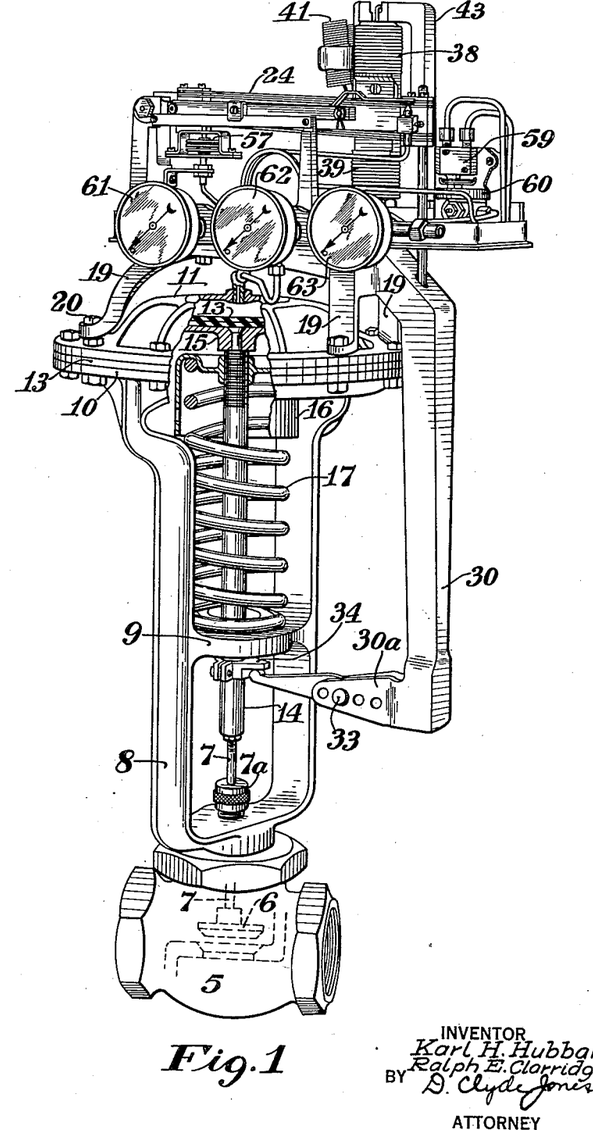
Fig. 1 is a perspective view of a dual response regulating unit mounted on a regulating valve.

Referring especially to Fig. 1, 5 designates a well-known form of fluid-actuated motor valve including a valve disc 6 carried on the valve stem 7 which passes through a stuffing box 7a. It will be understood that the valve 5 directly or indirectly controls the flow of a heating or cooling agent to the medium, the temperature of which is to be controlled. A frame 8 on the valve is provided with an intermediate support 9 and at its top with an annular frame 10. This flange cooperates with a flange on the diaphragm top 11 to grip the outer margin of a rubber diaphragm 13 so that an air chamber 12 (Fig. 4) is formed between the top and the diaphragm. The valve stem 7 has connected thereto a valve stem extension 14 on the upper end of which there is fastened the plate 15 in position to be engaged by the lower surface of the diaphragm 13. At a point below the plate 15 on the upper end of the extension 14 there is secured an inverted cup 16 to engage the upper end of a helical spring 17 which rests on the support 9 and which surrounds the valve extension 14 so that the valve stem tends to be moved to its uppermost position. It will be understood, however, that the valve structure just described is typical of one of many forms of fluid pressure actuated valves which may be used in the combination of the present invention.

Dual response unit

Figures 2, 2A:
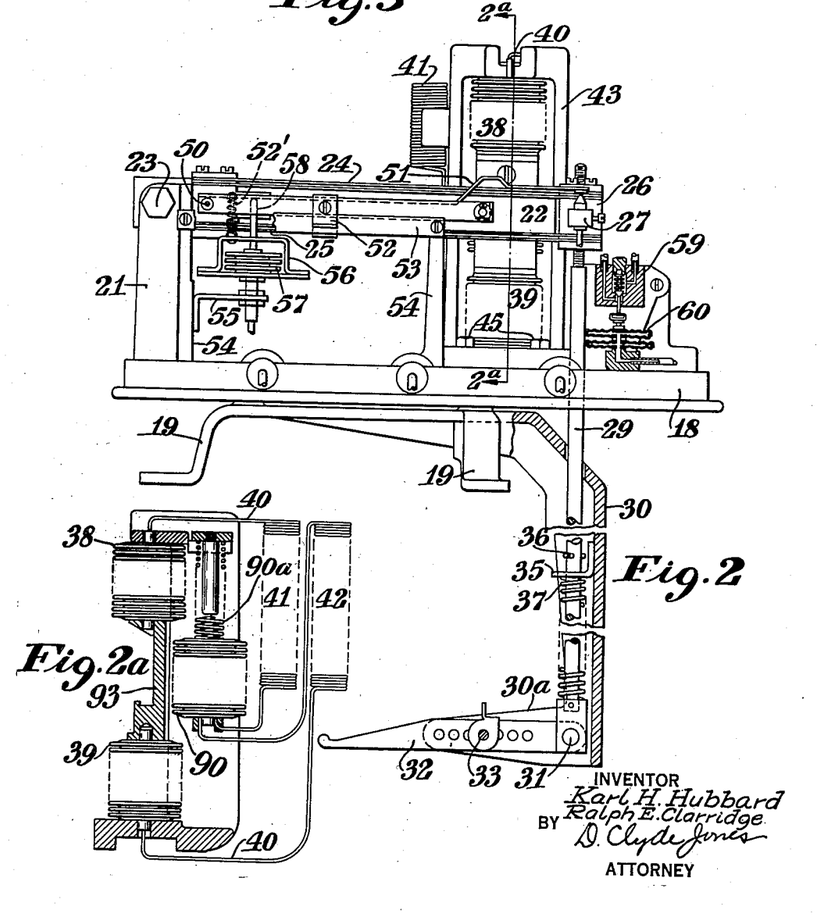
Fig. 2 is a side elevation of the dual response regulating unit of Fig. 1 without the regulating valve.
Fig. 2A is a sectional view taken on the line 2a—2a of Fig. 2.
Figure 3:
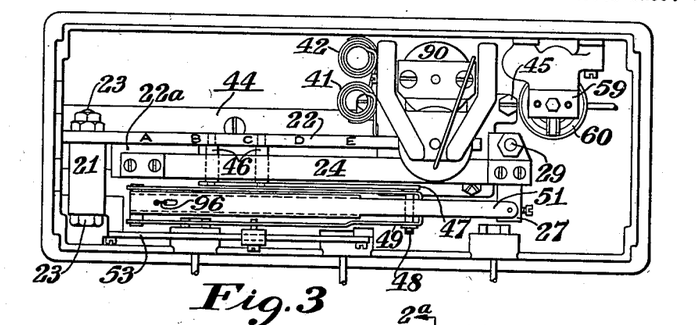
Fig. 3 is a plan view of the unit of Fig. 2.

On the top of this fluid pressure actuated motor valve there is mounted a so-called dual response unit, the details of which are best shown in Figs. 2, 2A, and 3. This unit includes a base 18 having legs 19 which are fastened to the top of the valve motor by suitable bolts such as 20. The base is provided with an upright 21 on which a main lever 22 is pivoted at 23. Two pairs of relatively stiff lever springs 24 and 25 have their left ends fastened to an extension 22a on the main lever and their right ends attached to a movable block 26. This block carries a nozzle 27 and is adjustably mounted on a push rod 29. The push rod is partially enclosed within a fixed bracket 30 which projects downwardly from the base, while the lower end of this push rod is pivotally connected at 31 to a lever 32, in turn, pivotally mounted at 33 on an extension 30a of the bracket. The lever 32, as well as the extension 30a, are provided with a series of sets of openings therein, in any set of which the pivot 33 may be inserted to accommodate the unit to any particular motor valve size or design. The free end of the lever 32 engages a lug 34 which is adjustably mounted on a movable part of the valve such as valve stem extension 14. As best shown in Fig. 2, the bracket 30 is provided with an arm 35 which has an aperture of sufficient size to permit the push rod 29 to pass therethrough without contacting, which arm also cooperates with the cross pin 36 on the push rod to limit the downward movement thereof. A coiled spring 37 at its upper end engages the lower side of the arm 35 while its lower end engages a shoulder on the push rod in such a manner that the spring tends to force the push rod downward until the cross pin 36 engages the arm 35. In the arrangement of the parts just described, the operation of the lever 32 and the push rod with its related parts, in response to any movement of the valve stem extension, causes the block 26 and the nozzle 27 mounted thereon to move a corresponding distance.

The movement of the main lever 22 is retarded by damping means including an upper damping bellows 38 and the lower damping bellows 39 which have their remote faces attached to a portion of a damping assembly frame 43 and which have their opposing faces respectively attached to the upper and lower edges of clamp 93 (Fig. 2A). This clamp is shaped to make sliding engagement with the upper and lower edges of the main lever. The upper end of the bellows 38 and the lower end of the bellows 39 are connected through a conduit 40 having connected in series therewith the expansion bellows 90 and the flowing resisting coils 41 and 42. The bellows 90 has its lower end resting on bracket 43a of the assembly frame 43, while its upper end is engaged by spring 90a, the tension of which may be adjusted to maintain at all times a positive pressure in the damping system. This construction allows the thermal expansion or contraction of the filling medium to take place with only small variations in pressure in the system. It should be mentioned that the length of the fluid course in the damping system from the bellows 39 to the bellows 90 is equal to the length of the corresponding fluid course from bellows 38 to bellows 90. The damping bellows 38 and 39 with the related conduit 40, flow-resisting coils 41 and 42, and compensating bellows 90, constitute a hermetically sealed, damping system which is completely filled with a liquid such as chlorbenzene, although the invention is not limited to the particular filling medium. This damping system is thus completely mounted on the mentioned damping assembly frame 43 which may be moved along the damping assembly slide bar 44 to various setting positions in accordance with a graduated scale marked with indicia A, B, C, D, E, on main lever 22 and then clamped thereto in the desired position by suitable clamping bolts 45 (Fig. 3). It will be understood that if the damping assembly frame 43 is located at the position designated E on the main lever 22, the time required for the liquid to be forced from one bellows to the other is greater than the time required for a similar forcing of liquid when the assembly is located at position A, since in the latter case the force applied to the bellows 38 or 39 would be less at position E. In practice, damping assemblies of different time ranges may be provided so that a damping assembly may be replaced on the damping assembly slide bar 44 by one having a different desired time range.

The main lever 22 has mounted thereon by means of posts 46, a bar 47 which mounting permits the bar 47 to move as a unit with the lever 22 without the posts 46 striking the springs 24 or 25. The free end of the bar 47 carries a pin 48 on which there is pivotally supported a U-shaped transmitting lever 49. This last-mentioned lever at its free end has pivotally mounted thereon at 50 a baffle 51. The lever 49 is supported on a fulcrum or pivot 52 which is adjustable along a fixed horizontal bar 53 rigidly held on the uprights 54 carried by the base. It should be pointed out that the bar 53 is of such length that fulcrum 52 can be moved to the left until it is directly beneath the pivot 50, or until it is at the left of pivot 50, so that the unit may be adjusted to operate as a single response or usual type of regulating device. In practice, the bar 53 is preferably marked with a suitable scale and indicia (A, B, C, D, and E), to indicate various settings of the adjustable pivot 52. The upright 54 on the base carries a bracket 55 on which there is mounted a frame 56 for a bellows or other capsular diaphragm element 57. The movable surface of this bellows carries a stud 58 which is held in engagement with the under surface of the baffle 51 by means of a coil spring 52' attached to the baffle and the bellows frame 56.

The base 18 of the unit also has supported thereon a relay air valve and the relay air valve bellows 60 for actuating it, while on the front of the base, as shown in Fig. 1 there is mounted an input air pressure gauge 61, an output air pressure gauge 62 and an air supply pressure gauge 63. It will be understood that the necessary conduit connections for supplying air pressure or fluid pressure to the various elements of the dual response unit and to the motor valve, are incompletely shown in the foregoing views, but these connections will be disclosed in the diagrammatic showings of Figs. 4, 5, and 6. While the unit which is herein disclosed may be used in various combinations, it is particularly useful in a dual response regulating system diagrammatically represented in the last-mentioned figures.

Recording regulator with sensitivity reducer

Figure 4:
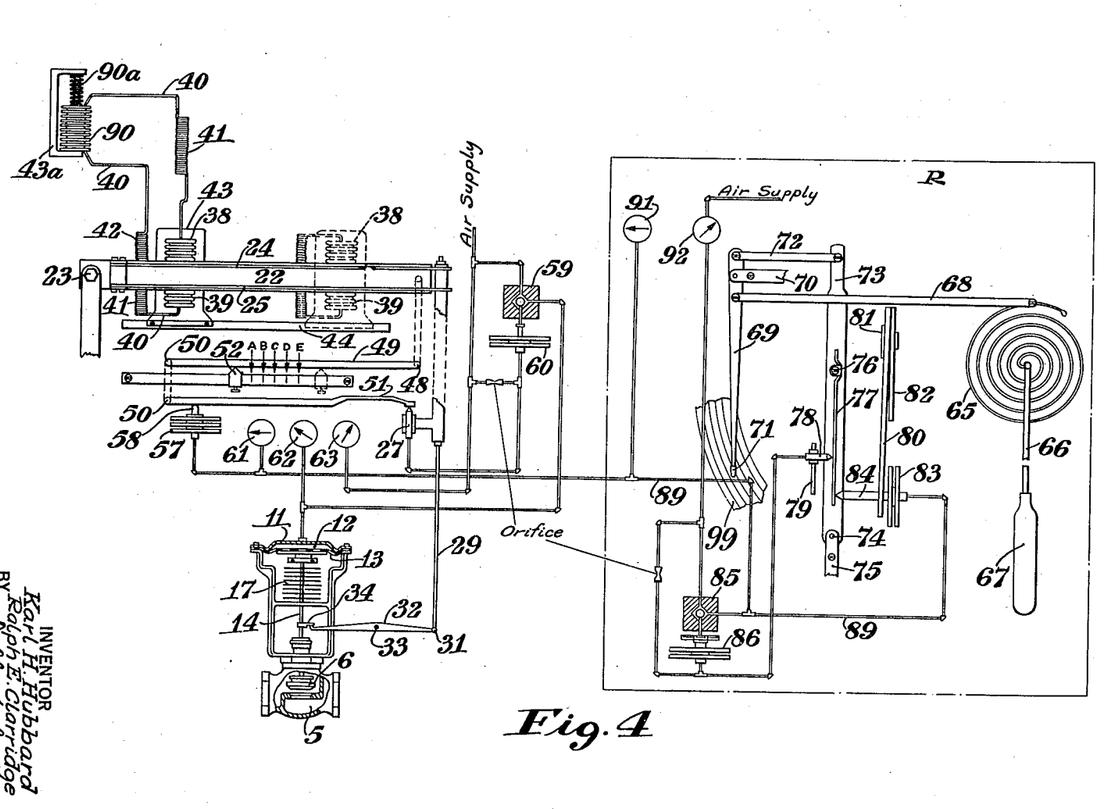
Figs. 4, 5, and 6 diagrammatically represent in various stages of operation a dual response regulating system including a recording regulator, a dual response unit and a motor valve actuated thereby.
Figure 5:
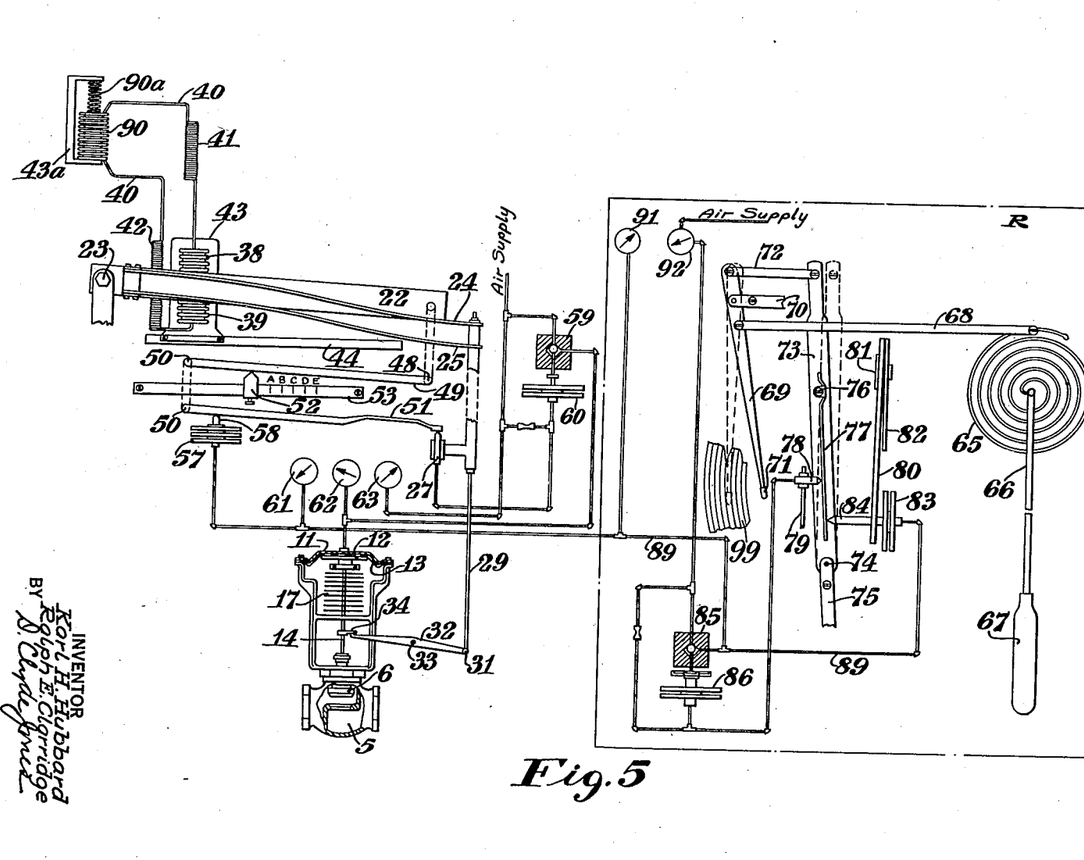
Figure 6:
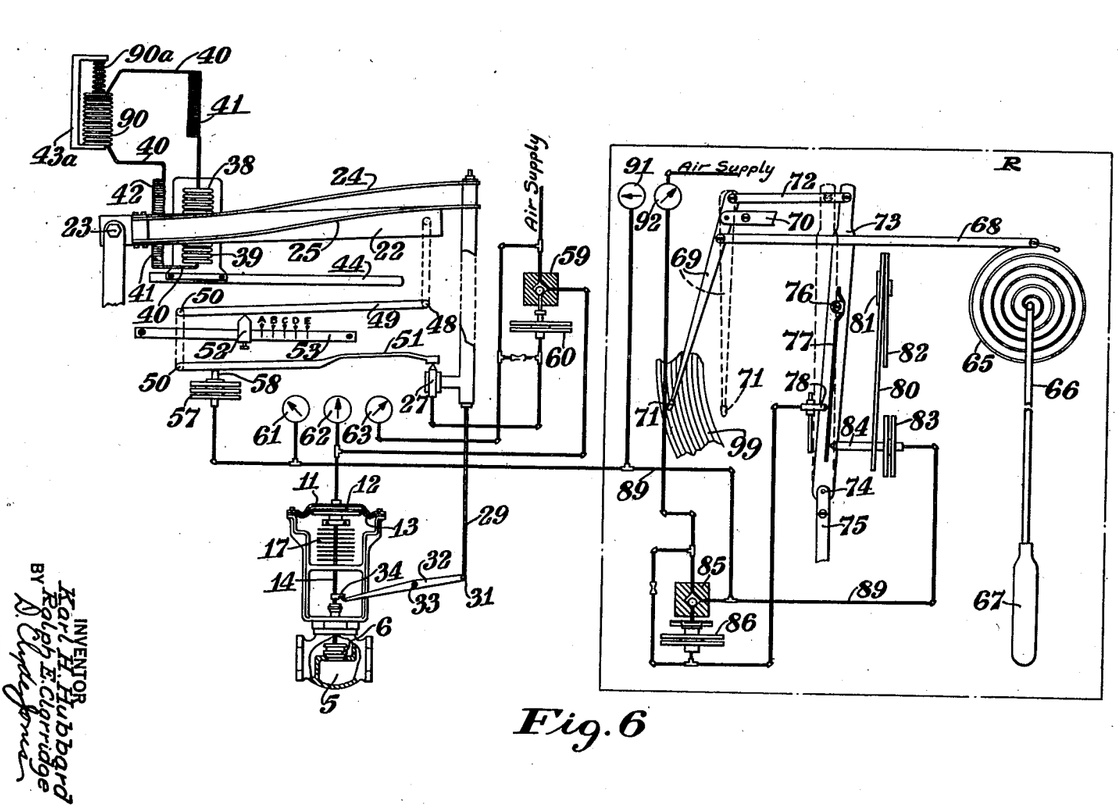

At the right of Figs. 4, 5, and 6 there is indicated a recording regulator R including the Bourdon actuating coil 65 connected by a capillary tube system 66 to a thermosensitive bulb 67 which is positioned so that it is responsive to the prevailing temperature of the medium to be regulated. The free end of the Bourdon spring is connected by a link 68 to a pen arm 69 which is pivotally supported on the fixed bracket 70. The pen arm 69 is provided at one end with the pen or stylus 71 which inscribes a temperature curve on clock-actuated chart 99 illustrated in part only, while the other end of the pen arm is connected by a link 72 to the upper end of the baffle-carrying lever 73 which is pivoted at 74 on a fixed bracket 75. The lever 73 has pivotally mounted thereon a baffle 77 in operative relation to a rigidly supported nozzle 78 which is adjustable vertically on a fixed rod 79. A spring 80 which is adjustably fastened at 81 on a bracket 82 engages at its lower end the movable face of a rigidly supported bellows 83 said face having mounted thereon a synchronizing pin 84. This bellows and its pin 84 together with the spring 80, which can be adjusted on bracket 82 to vary its length and thereby adjust its tension, constitutes a so-called sensitivity reducer, the function of which will be hereinafter set forth. In connection with the recorder there is provided a relay air valve 85, the valve stem of which is actuated by the bellows 86. For convenience in observing and adjusting the operation of the regulator it is provided with a supply pressure gauge 92 and an output pressure gauge 91.

Operation of system in absence of load fluctuation

Fig. 4 illustrates the regulating system in a balanced condition operating under a substantially uniform load or uniform quantity of temperature-regulated medium requiring a half-open condition of valve 5. In this condition, spring levers 24 and 25 and damping bellows 38 and 39 are in a state of equilibrium so that the spring levers are parallel with the main lever 22. As the temperature is being uniformly maintained, there is no movement of the recorder baffle 77 and the output control pressure as indicated on air gauges 61 and 91 is that which is the established control pressure when the desired temperature in the medium to be regulated, is being maintained. As the air pressure in capsular diaphragm 57 is steady, baffle 51 is motionless. This results in steady air pressure in capsular diaphragm 60 with a consequent throttling of valve 59 which permits the proper flow of air to diaphragm chamber 12 of the motor valve, thereby maintaining the correct opening of the valve disc 6 as long as the load remains constant.

Operation of system when load increases

Fig. 5 indicates the operation of the system when an increase in load takes place. It must be understood, however, that to effect any change in the balanced condition of the regulator system as just described above, at least a small temperature change at the bulb 67 must take place to start regulating action. For instance, in the system as illustrated, an increase in load effects a decrease in temperature at bulb 67, causing the free end of the Bourdon spring 55 to move toward the right, thereby moving link 68 and pen arm 69 to a position as shown in full lines, to record the temperature drop. Pen arm 69, which is pivoted at 70, moves the link 72 toward the left which movement rotates the baffle lever 73 counterclockwise about its pivot 74. Thus the baffle 77 which is pivoted at 76 and which at its free end engages the synchronizing pin 84, moves toward the nozzle 78 so that the distance between the open end of the nozzle and the baffle is decreased, thereby causing an increase in pressure in bellows 86 which expands, tending to close air relay valve 85 of the recording regulator. The operation of this valve causes a drop in pressure in conduit 89 leading to bellows 83 and to capsular diaphragm 57 permitting them to contract. As the bellows 83 contracts, it decreases the force on spring 80 so that the synchronizing pin 84 moves to the right thereby allowing the lower end of the baffle 77 to follow in the same direction. This movement of the baffle 77 slightly increases the distance between itself and the nozzle 78 with the resultant decrease in pressure in bellows 86, which thereupon acts on valve 85 to prevent a further decrease of pressure in conduit 89 leading to capsular diaphragm 57. It should be understood that the total movement at the nozzle 78 of the baffle 77, and therefore the pressure change in conduit 89, is proportional to the temperature change at the bulb 67, the magnitude of this movement depending upon the sensitivity adjustment of the spring 80. For high sensitivity the adjustable clamp 81 for spring 80 is moved downward, while for low sensitivity it is moved upward.

As the capsular diaphragm 57 contracts, the free end of the baffle 51 moves toward nozzle 27 decreasing the distance therebetween. This movement causes an increase in pressure in bellows 60 which expands, thereby tending to close air relay valve 59. This operation of the relay air valve causes a decrease of air pressure supplied to the diaphragm motor 12 which effects a greater opening of the valve 5 due to the action of the spring 17 on the valve stem extension. As the valve stem extension moves upward, the left end of the lever 32 which normally tends to move upward due to the action of the spring 37 also follows its upward movement, being controlled by engagement with lug 34. At this time the right end of lever 32 moves downward carrying with it the push rod 29. It will be remembered that the push rod is connected at its upper end through block 26 to nozzle 27 and to spring levers 24 and 25 so that in moving downward it bends the spring levers downward and carries with it the nozzle 27 until the clearance between this nozzle and the baffle 51 is sufficient to cause the air relay valve to give steady throttling control in a temporary position. The pressure indicated on gauges 61 and 91 at this time will be less than normal and gauge 62 will also indicate a lower pressure in diaphragm chamber 12 of the motor valve. The operations thus far described constitute the "first response", and the resulting temperature due to the change in load or quantity of the medium to be regulated, will be temporarily below that desired.

The following operations of the system incident to restoring the desired temperature in the medium are herein referred to as the "second response". Since there is a force applied to springs 24 and 25 due to the downward movement of the push rod 29, this force is applied through these springs to main lever 22 so that the free end of this lever and the bar 47 carried thereby, tend to move downward about the fixed pivot 23. The force acting on main lever 22 which is positioned between the two completely filled bellows 38 and 39 causes the pressure in bellows 39 to increase and the pressure in bellows 38 to decrease, forcing the liquid from bellows 39 through resistance coils 41 and 42 into the upper bellows 38. These resistance coils retard the flow of liquid from one bellows to the other, thereby measuring a predetermined time interval in which the second response occurs, the duration of which interval may be changed by varying the position of the damping assembly 43 with respect to pivot 23 so that the regulating system can function properly even when the "time-lag" in the controlled system, is considerable.

Since the end of main lever 22 now gradually moves downward, it acts through pivot 48 to swing the transmitting lever 49 about its adjustable fulcrum 52. This swinging movement elevates the left end of lever 49 and also the left end of baffle 51 which is pivotally connected to it at 50. The free end of the baffle is gradually lowered toward nozzle 27 with the consequently gradually increasing pressure in bellows 60. In response to this gradual increase in pressure, the bellows 60 slowly expands and actuates air valve 59 to permit the air pressure to escape slowly from the chamber 12 of the motor valve so that spring 17 continues to effect further slow upward travel of the valve stem extension 14 and the valve disc 6. Since the valve stem extension 14 thus moves upward, the push rod 29 continues to move downward, thereby further moving the free ends of springs 24 and 25 downward and also continuing the downward movement of the nozzle 27. The tension on springs 24 and 25 continues to lower the free end of bar 22 which through the previously mentioned connections, continues to lower the free end of the baffle toward the nozzle 27. In response to this continued downward movement of the baffle, the pressure gradually continues to increase further in the bellows 60 which actuates air relay valve 59, to permit the further escape of air from the chamber 12 of the motor valve, thereby permitting the spring 17 to effect a continued gradual upward movement of the valve stem extension 14. This movement of the valve stem extension results in the lowering of the push rod 29 carrying with it the right ends of the springs 24 and 25, and also the nozzle 27. It will be understood that the primary response has a magnitude, and that the second response is effected at a rate, dependent on the deviation from the normal temperature.

Thus by a slow continuous movement following the first response, the valve 5 continues to be opened until such a time as the bulb 67 of the regulator indicates that the proper amount of heat has been introduced into the medium to restore the desired temperature. Of course, the bulb 67 responds gradually during the periods of the first and second responses, and the expansion of the filling medium therein gradually moves the free end of the Bourdon spring 65 toward the left, carrying with it the link 68 and the pen arm 69 which is connected to the link. This pen arm through the link 72 swings the baffle lever clockwise thereby moving the baffle 77 away from the nozzle 78. In response to this movement of the baffle, the pressure in the bellows 86 is decreased, thereby opening the valve 85 to supply an increasing amount of air pressure to the bellows 83 and to the capsular diaphragm 57. The bellows 83 thereupon expands and tends to move the baffle 77 slightly toward the nozzle 78, thereby modifying the original movement of this baffle due to the action of the Bourdon spring 65. However, the total movement of the baffle and therefore the pressure change in the control conduit 89 is proportional to the temperature change at the bulb 67, the magnitude of the baffle movement depending upon the position of the adjustable clamp 81 and upon the position of the nozzle 78.

The increase in pressure in the conduit 89 gradually expands the capsular diaphragm 57 so that the free end of the baffle, if not otherwise actuated, would tend to rise. However, simultaneously with the expansion of the capsular diaphragm 57, the main lever 22, which is still pulled downward at this time by the spring levers 24 and 25, continues to move downward slowly under the restraining action of the damping system, with the result that the tension in the spring levers 24 and 25 is gradually reduced. The resultant of these two mentioned actions which is usually small, is such that the free end of the baffle moves more slowly. While the temperature is being restored to the control point, the tension in the spring levers 24 and 25 has thus been gradually reduced as indicated, and has also been partially balanced by the resilience of the bellows 38 and 39 so that the end of the main lever 22 descends more and more slowly. Finally, when the temperature reaches its predetermined value, the capsular diaphragm 57 has expanded to its normal position and the spring force of the retard bellows 38 and 39 balances the force of the spring levers 24 and 25 and the regulating system is again in condition of equilibrium with the desired temperature existing about the bulb 67. However, the end of the baffle 51, the main lever 22, the nozzle 57 and the valve stem extension 14 have assumed new positions corresponding to the new load.

At this time the pressure indicated on the gauges 61 and 91 will be normal. Since these gauges indicate normal pressure readings, only when the control point temperature is being maintained they provide an accurate indication of any deviation from the predetermined temperature. In accordance with the present invention the gauge 91 may be located at a point remote to the recording regulator, for example, at a remote supervisory station to give an immediate indication of any deviation from the required controlled condition.

The cycle of operation of the dual response regulating system depends a great deal on the character of the disturbance that causes its action and also upon the character of the regulated equipment. The method of operation as described above is for the simplest kind of temperature disturbance and the apparatus is of the simplest kind, in order to simplify the description of the operation of the system. In this simplest cycle of operation it is assumed (first) that a steady temperature condition exists which is interrupted by an abrupt load increase to a new constant value with steady conditions prevailing, (second) the character of the apparatus is such that the full effect of the load change is completed in a short time such as thirty seconds, (third) that there is very little delay in the response of the thermo-responsive element and the initial control action is such that the first response is completed in a short time such as forty-five seconds after the disturbance started and the apparatus is under control so that if there were no second response the condition of the regulating system would be that of the final equilibrium. In this connection it should be noted that the second response has actually started so that, strictly speaking, the equilibrium condition of a single response regulating system is not actually reached, (fourth) that the unit sensitivity of the recording regulator is low enough to avoid any tendency to "hunt" where unit sensitivity is defined as the bulb temperature change necessary to cause the valve disc 6 to operate from its full open to its full closed position, (fifth) that the second response is completed in ten or fifteen minutes after the start of the original disturbance.

Under these assumed conditions the cycle or sequence of operations is as above described. For controlled apparatus of different character and for other adjustments of the regulating system, the actual valve movement during the latter part of the correcting period may be in the same direction as the initial movement, in the reverse direction or there may be practically no movement at all.

Operation of system when load decreases

In Fig. 6 the regulating system is shown with the several parts thereof in the relative position which they would assume when the load decreases with the resultant decrease in the temperature of the medium. The operations of the system under decreased load will repeat those described in connection with Fig. 5 wherein the load increased, except that in this instance the operations of the several parts will be in the opposite sense from those therein described.

Precision valve action

Any movement or lack of movement of the valve stem extension 14 which may be caused by any means other than the movement of baffle 51, such as fluctuations in pressure in the air supply, fluctuations in the pressure of the controlled medium passing through valve 5, and friction of the stuffing box 7a, will be immediately compensated for by the action of the dual response unit. During normal throttling operation, the approximate clearance between the baffle 51 and the nozzle 27 is about .020". Consequently any movement of the push rod 29 in response to a movement of the valve stem and its extension will change this clearance and a change of only .003" or less, is needed to cause the entire pressure of the air supply source or the full action of spring 17, as the case may be, to be applied to the motor 12 of the motor valve 5, thereby adjusting it to the required position to effect the desired regulation.

If, however, the source of air pressure fluctuates, the motor valve will still be correctly positioned to effect the desired regulation. In the event that there is an increase in the air pressure at the nozzle 27, this will reduce the flow of pressure fluid through the valve 59 causing an upward movement of the valve stem extension 14 with a consequent downward movement of the push rod 29 which carries with it the nozzle 27. This increases the distance between the baffle 51 and the nozzle thereby providing a larger area for air pressure to escape with the resultant decrease of air pressure supplied to the bellows 60. This bellows thereupon contracts and opens the valve 59 supplying further air pressure to the motor diaphragm 12 of the motor valve to return it to its proper position.

In the event that there is a decrease of air pressure at the nozzle 27, the reverse of the operations just described will be effective to restore the motor valve 5 to its proper position.

Fluctuations in the pressure of the heating or regulating medium passing through the single seated motor valve 5 have a noticeable action that tends to cause the disc 6 to move, with a consequent change in the flow of the medium through the valve. The movement of this valve disc moves the valve stem extension and consequently the push rod, to vary the position of the nozzle 27 with respect to baffle 51. This movement will result in a change in pressure in the bellows 60 which actuates the valve 59 to effect a change in the flow of air to the motor valve 5 so that its disc 6 will remain essentially unchanged in position.

If there is such friction in the stuffing box 7a that the valve stem extension 14 does not immediately position itself in accordance with the variation in the space between the baffle and the nozzle, then the full pressure of the air supply or valve spring 17, as the case may be, will be supplied to the motor of the valve 5 to overcome this friction.

In the event that the rubber diaphragm 11 becomes hardened so that the operation of the valve is retarded, the operation of the system is the same as in the case of stuffing box friction and consequently the valve will be adjusted to effect the proper control. This action is important even with the diaphragm 11 in good condition as such diaphragms exhibit a considerable amount of internal friction or hysteresis.

It should be emphasized that an important feature of the present invention is the combination of dual response and precision valve action in a regulating system, since this combination insures the accurate adjustment of the regulating valve to the precise position determined by the exact control of the dual response unit. If dual response is used without precision valve action, the friction of the normal stuffing box of the valve would disturb the control effected, due to the low unit sensitivity which dual response applications require. However, with the present combination of dual response regulation and precision valve action, a force as much as five hundred times greater than that possible in conventional valves, is applied to the valve to overcome friction and other conditions preventing accurate valve action.

Adjustment of the dual response unit

For all load changes, the dual response regulating system may be adjusted to give "complete compensation", that is, restore the controlled temperature to the predetermined value, or it may be adjusted for "over-compensation", that is, to return the controlled temperature above the predetermined value in case the initial deviation was downward. This system may also be adjusted for "under-compensation", that is, to return the controlled temperature below the predetermined value in case the initial deviation is downward. These three different results may be obtained by the various adjustments of the pivot 52 with respect to the damping assembly frame 43. Complete compensation is effected by adjusting the pivot 52 and the damping assembly frame 43 to the same corresponding position such as marked E on the main lever 22 and E on the bar 53. A deviation to the right or to the left from the last-mentioned setting will result in over-compensation or under-compensation of the system, as the case may be.

It should be mentioned that the purpose of adjusting the clamping assembly 43 and the adjustable pivot 52 to corresponding graduations such as E—E on bar 53 and main lever 22, is so that the movement of the baffle due to the movement of the pivot 50 is independent of the position of the damping assembly including the bellows 38 and 39 which, in part, controls the movement of the main lever 22.

It has been mentioned that the pivot 52 may be placed under the pivot 50. This adjustment constitutes one of the important design features of the device, and is provided to permit the second response to be eliminated entirely. Elimination of this second response during the testing of the equipment greatly facilitates the correction of operating difficulties. If "hunting" exists in the regulating system it may be due to too rapid a second response, or it may be due to too high a sensitivity. Both of these variables are possible sources of "hunting", and if it is not possible to eliminate one of these variables during the adjustment of the regulating system, the correction of the "hunting" can only be effected by a cut and try method of varying first one variable and then the other. However, in the present design, by permitting temporary elimination of the second response it is possible without difficulty to determine which adjustment or variable is causing the "hunting", so that it can be quickly corrected.

While the present invention has been disclosed in connection with a temperature regulating system, it is equally applicable to all controlled conditions such as the control of pressure, the flow of fluid or the level of a liquid.

We claim:

1. In an arrangement of the class described, a valve, primary responsive means of low sensitivity and secondary responsive means of higher sensitivity including at least a part of said primary means, both means being responsive to a condition to be regulated to indicate a required opening of said valve, and mechanism for actuating said valve until said indicated opening thereof is established.

2. In an arrangement of the class described, a valve, a prompt-acting primary responsive means of low sensitivity and a sluggish secondary responsive means of higher sensitivity including at least a part of said primary means, both means being responsive to a condition to be regulated to indicate a required opening of said valve, and mechanism for actuating said valve until said required opening thereof is exactly established.

3. In an arrangement of the class described, a valve provided with a valve motor, a regulating device responsive to conditions to be regulated for controlling the operation of said valve motor to govern said valve, mechanism including a completely filled liquid damping system for modifying the control effected by said regulating device in accordance with said condition to be regulated, and resilient means actuated by said valve motor for operating said mechanism.

4. In an arrangement of the class described, a valve provided with a valve motor, a regulating device responsive to conditions to be regulated for controlling the operation of said valve motor to govern said valve, mechanism including hermetically sealed damping means provided with a substantially inelastic medium for modifying the control effected by said regulating device in accordance with said conditions to be regulated, and a resilient connection actuated from said motor for operating said mechanism.

5. In an arrangement of the class described, a regulating fluid conduit, means responsive to a condition to be controlled for acting upon the conduit to effect a substantial immediate primary variation in the flow of regulating fluid therethrough, and other means including at least a part of said first means and responsive to said condition for effecting a secondary slow variation in the fluid flowing through said conduit, said other means including a fluid damping system completely sealed from the atmosphere.

6. In an arrangement of the class described, a valve provided with a valve motor, a regulating device responsive to conditions to be regulated for controlling the operation of said valve motor, and means actuated by said valve motor for modifying the control effected by said regulating device, said means including a hermetically sealed fluid damping system.

7. In a system of the class described, a valve provided with a valve motor, a regulating device responsive to conditions to be regulated for controlling the operation of said valve motor, and means governed by said valve motor for supplementing over a period of substantial duration the control effected by said regulating device, said means including a hermetically sealed fluid damping system.

8. In a system of the class described, a regulating fluid conduit, primary means responsive to a condition to be controlled for acting upon the conduit to effect a substantial immediate primary variation in the flow of regulating fluid therethrough, secondary means including at least a part of said primary means and responsive to said condition for effecting a secondary slow variation in the fluid flowing through said conduit, said secondary means including a damping system containing a liquid completely sealed from the atmosphere, and means for maintaining the liquid pressure in said damping system within a predetermined range irrespective of temperature changes.

9. In an arrangement of the class described, a regulating fluid conduit, primary means responsive to a condition to be controlled for acting upon the conduit to effect a substantial immediate primary variation in the flow of regulating fluid therethrough, and pressure-operated secondary means including at least a part of said primary means and responsive to said condition for effecting a secondary slow variation in the fluid flowing through said conduit, said secondary means being selectively adjustable at will to reduce said secondary slow variation to a negligible amount.

10. In an arrangement of the class described, a regulating fluid conduit, primary means responsive to a condition to be controlled for acting upon the conduit to effect a substantial immediate primary variation in the flow of regulating fluid therethrough, and pressure-operated secondary means including at least a part of said primary means and responsive to said condition for effecting a secondary slow variation in the fluid flowing through said conduit, said secondary means being selectively adjustable at will to adjust the magnitude of said secondary slow variation without disturbing the magnitude of said primary variation.

11. In an arrangement of the class described, a regulating fluid conduit, primary means responsive to a condition to be controlled for acting upon the conduit to effect a substantial immediate primary variation in the flow of regulating fluid therethrough, and pressure-operated secondary means including at least a part of said primary means and responsive to said condition for effecting a secondary slow variation in the fluid flowing through said conduit, said secondary means being selectively adjustable at will to adjust the magnitude of said secondary slow variation without disturbing the magnitude of said primary variation and without disturbing the rate of said secondary slow variation.

12. In an arrangement of the class described, a controlling element, a regulating device responsive to conditions to be regulated for governing the operation of said controlling element, mechanism including timing means for modifying the control effected by said regulating device in accordance with said condition to be regulated, said timing device being slidably adjustable to vary its period of operation.

13. In apparatus of the class described, a movable lever, an element actuated by said lever, a second element in operative relation to said first element, a valve provided with a valve motor controlled by the relative movement of said elements, a member connected to said second element and resiliently connected to said lever, said member being responsive to the operation of said valve motor, a device responsive to conditions to be regulated for separately controlling the operation of said first element, and means for damping the movement of said lever.

14. In apparatus of the class described, a pivoted lever, an element actuated by said lever, a second element in operative relation to said first element, a valve provided with a valve motor, said motor being controlled by the relative movement of said elements, a member connected to said secondary element and resiliently connected to said lever, said member being responsive to the operation of said valve motor, means for damping the movement of said lever, said means being slidable along said lever with respect to said pivot to adjust the rate of damping, and a device responsive to conditions to be regulated for separately controlling the operation of said first element.

15. In a system of the class described, a motor valve provided with a valve stem and functioning to control the flow of a regulating medium, a regulating unit including two elements, both of which cooperate by a relative movement therebetween to control the flow of an actuating fluid to the motor of said valve for effecting a primary operation thereof, a device responsive to conditions to be regulated for controlling the movement of one of said elements, and means actuated proportionally to the movement of the valve stem throughout a period of any predetermined duration for causing a relative movement of said elements to modify the control of said device.

16. In a system of the class described, a motor valve provided with a valve stem and functioning to control the flow of a regulating medium, a regulating unit including a baffle and a nozz'e which control the flow of an actuating medium to the motor of said valve, a device responsive to conditions to be regulated for controlling the movement of said baffle, means actuated by the valve stem for moving said baffle and said nozzle, and means for delaying the last-mentioned movement of said baffle.

17. In a system of the class described, a motor valve provided with a valve stem and functioning to control the flow of a regulating medium, a regulating unit including a baffle and a nozzle which control the flow of an actuating medium to the motor of said valve, a device responsive to conditions to be regulated for controlling the movement of said baffle, means actuated by the valve stem for causing movement of said nozzle and an additional movement of said baffle, and means including a sealed fluid damping system for retarding the last-mentioned movement of the baffle.

18. In a system of the class described, a regulating valve provided with a valve motor, a unit including two movable elements cooperating to control the operation of said valve motor, means actuated by said valve motor for moving said elements, means for retarding the movement of one of said elements, and means responsive to changes in a condition to be regulated for moving said last-mentioned element independently of said retarding means.

19. In apparatus of the class described, a movable lever, damping means for retarding the movement of said lever, a pivoted baffle actuated by said lever, an adjustable fulcrum to modify the action of said baffle, a nozzle in operative relation to said baffle, a valve provided with a valve stem and controlled by the relative movement of said baffle and said nozzle, a member connected to said nozzle and resiliently connected to said lever for actuating the same, said member being responsive to the movement of said valve stem, said fulcrum being adjustable with respect to said pivot to render said baffle independent of actuation by said lever, and a device responsive to conditions to be regulated for controlling the operation of said baffle.

20. In apparatus of the class described, a pivoted lever, a damping assembly for retarding the movement of said lever, said damping assembly being movable with respect to the pivot of said lever for varying the damping effect of said assembly on said lever, a baffle actuated by said lever, a nozzle in operative relation to said baffle, a control member governed by the relative movement of said baffle and said nozzle, and means connected to said nozzle and resiliently connected to said lever for actuating the same, said means being responsive to the movement of said control member.

21. In apparatus of the class described, a motor valve provided with a valve stem and functioning to control the flow of a regulating medium, a regulating unit including a baffle and a nozzle which cooperate to control the flow of pressure fluid for operating said valve, a device responsive to conditions to be regulated for controlling the relation between said baffle and said nozzle, said baffle and said nozzle both being further actuated by said valve stem.

22. In a system of the class described, a motor valve provided with a valve stem and functioning to control the flow of a regulating medium, a regulating unit including a baffle element and a nozzle element both of which cooperate to control the flow of an actuating fluid to the motor of said valve, a device responsive to conditions to be regulated for controlling the movement of one of said elements, and means actuated by the valve stem for moving said baffle and said nozzle elements.

23. In apparatus of the class described, a movable lever, means for damping the movement of said lever, an element actuated by said lever, an adjustable pivot for said element, a second element in operative relation to said first element, mechanism controlled by the relative movement of said elements, a member connected to said second element and resiliently connected to said lever, said member being responsive to the operation of said mechanism, and means responsive to a condition to be regulated, for operating said first element.

24. In a control arrangement, a nozzle and a baffle in cooperative arrangement, a source of pressure fluid, a valve and operating means therefor, a fluid connection from said source to said nozzle and to said means, mechanism responsive to a condition to be regulated for changing the relation between said baffle and said nozzle to control the pressure in said connection and therefore actuate said means, a pressure-fluid responsive unit serving when operated to modify the changed relation between said baffle and said nozzle, a pressure-fluid connection controlled by said valve and leading from said source to said unit, and means for adjustably restraining the action of said unit.

25. In a control arrangement, a nozzle and a baffle in cooperative relation, a support on which said nozzle is slidably mounted for adjustment with respect to said baffle, a source of pressure fluid, a valve and operating means therefor, a fluid connection from said source to said nozzle and to said means, mechanism responsive to a condition to be controlled for moving said baffle to control the pressure in said connection and therefore the pressure in said means, a pressure-fluid responsive unit engaging said baffle and serving when operated to modify the original movement of said baffle, a pressure-fluid connection controlled by said valve and leading from said source to said unit, and means for adjustably controlling the magnitude of action.

26. In a control arrangement, a nozzle and pivoted baffle in cooperative relation, a source of pressure fluid, a valve and operating means therefor, a fluid connection from said source to said nozzle and to said means, mechanism responsive to a condition to be controlled for moving said baffle to control the pressure in said connection and therefore the pressure in said means, a pressure fluid responsive unit engaging said baffle and serving when operated to modify the original movement of said baffle, a pressure-fluid connection controlled by said valve and leading from said source to said unit, a spring opposing said unit, and means for varying the flexibility of said spring.

27. In an arrangement of the class described, a valve, primary responsive means of low sensitivity and secondary responsive means of higher sensitivity including at least a part of said primary means, both means being responsive to a deviation from a normal condition to be maintained, to progressively indicate the required opening of said valve tending to correct the deviation from said condition, and mechanism for actuating said valve until said indicated opening thereof is established.

28. In an arrangement of the class described, a valve, prompt-acting primary responsive means of low sensitivity and sluggish secondary responsive means of higher sensitivity including at least a part of said primary means, both means being responsive to a deviation from a normal condition to be maintained to progressively indicate a required opening of said valve tending to correct the deviation from said condition, and mechanism for actuating said valve until said required opening thereof is exactly established.

29. In an arrangement of the class described, a regulating valve having an actuating motor, a fluid conduit leading to said motor, primary means responsive to a condition to be controlled for acting upon the conduit to effect a substantial immediate primary variation in the flow of regulating fluid therethrough, and secondary means including at least a part of said primary means and responsive to said condition for effecting a secondary slow variation in the fluid flowing through said conduit, said primary means and said secondary means operating jointly to progressively indicate a changing required opening of said valve until an ultimate exact required opening thereof is indicated, said valve motor cooperating with said primary means and said secondary means to adjust said valve until the ultimate indicated valve opening is attained.

30. In an arrangement of the class described, a regulating valve having an actuating motor, a fluid conduit leading to said motor, primary means responsive to a condition to be controlled for acting upon the conduit to effect a substantial immediate primary variation in the flow of regulating fluid therethrough, and secondary means actuated by said motor and including at least a part of said primary means, said secondary means being responsive to said condition for effecting a secondary slow variation in the fluid flowing through said conduit, said primary means and said secondary means operating jointly to continuously indicate a changing required opening of said valve until an ultimate exact required opening thereof is indicated, said secondary means cooperating with said valve motor to apply pressure fluid thereto through said conduit until the ultimate indicated opening of said valve is effected.

31. In an arrangement of the class described, a regulating fluid conduit, means responsive to a condition to be controlled for acting upon the conduit to effect a substantial immediate primary variation in the flow of regulating fluid therethrough, and other means including at least a part of said first means and responsive to said condition for effecting a secondary slow variation in the fluid flowing through said conduit, said other means including a liquid-filled damping system completely sealed from the atmosphere.

32. In a system of the class described, a regulating fluid conduit, primary means responsive to a condition to be controlled for acting upon the conduit to effect a substantial immediate primary variation in the flow of regulating fluid therethrough, secondary means including at least a part of said primary means and responsive to said condition for effecting a secondary slow variation in the fluid flowing through said conduit, said secondary means including a damping system containing a liquid completely sealed from the atmosphere, said damping system being arranged to maintain the liquid pressure therein within a predetermined range irrespective of temperature changes.

KARL H. HUBBARD.
RALPH E. CLARRIDGE.